United States Patent
Jung

(10) Patent No.: US 7,643,619 B2
(45) Date of Patent: Jan. 5, 2010

(54) METHOD FOR OFFERING TTY/TDD SERVICE IN A WIRELESS TERMINAL AND WIRELESS TERMINAL IMPLEMENTING THE SAME

(75) Inventor: In-Hyung Jung, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 638 days.

(21) Appl. No.: 11/222,843

(22) Filed: Sep. 12, 2005

(65) Prior Publication Data

US 2006/0140353 A1   Jun. 29, 2006

(30) Foreign Application Priority Data

Dec. 28, 2004   (KR) .................. 10-2004-0113738

(51) Int. Cl.
*H04M 11/00* (2006.01)
*H04M 1/00* (2006.01)

(52) U.S. Cl. ............... 379/52; 379/90.01; 379/93.05

(58) Field of Classification Search ............ 379/52, 379/90.01, 93, 5, 93.06, 93.17, 93.28, 100.06, 379/100.17; 455/567, 557, 550.1; 340/691.5, 340/7.58
See application file for complete search history.

(56) References Cited

U.S. PATENT DOCUMENTS 6,359,550 B1 *  3/2002  Brisebois et al. ......... 340/407.1

2003/0108165 A1    6/2003  Engelke et al.
2003/0157968 A1    8/2003  Boman et al.
2004/0131048 A1 *  7/2004  Cook et al. ................ 370/352
2004/0137944 A1 *  7/2004  Lee et al. .................... 455/557

FOREIGN PATENT DOCUMENTS

| EP | 0866592 | 9/1998 |
| EP | 1260949 | 11/2002 |
| GB | 2409605 | 6/2005 |
| JP | 10023545 A * | 1/1998 |

* cited by examiner

*Primary Examiner*—Melur Ramakrishnaiah
(74) *Attorney, Agent, or Firm*—Roylance, Abrams, Berdo & Goodman, LLP

(57) ABSTRACT

A method and a terminal are provided for performing a Teletype/Telecommunications Device for the Deaf (TTY/TDD) service where the wireless terminal changes to a vibration mode when the TTY/TDD service is performed. If a called party number and a call key are input, a call connection request signal is transmitted and a first vibration is generated. A second vibration is generated if a call ready signal is received after the call connection request signal is transmitted. A third vibration is generated if an absence signal is received. Accordingly, the TTY/TDD service can be supported in the wireless terminal without the aid of other external devices, and a hearing-impaired user can immediately recognize a TTY/TDD text reception or transmission state by generating a different vibration when the call connection request signal, the call ready signal, or the absence signal is detected and generating a vibration, text messages, and/or an image when TTY/TDD text messages are received or transmitted during the TTY/TDD service.

5 Claims, 8 Drawing Sheets

METHOD FOR OFFERING TTY/TDD SERVICE IN A WIRELESS TERMINAL AND WIRELESS TERMINAL IMPLEMENTING THE SAME

PRIORITY

This application claims the benefit under 35 U.S.C. §119(a) of a Korean Patent Application entitled "Method for TTY/TTD Service in Wireless Terminal", filed in the Korean Intellectual Property Office on Dec. 28, 2004, and assigned Serial No. 2004-113738, the entire contents of which are hereby incorporated by reference.

BACKGROUND OF THE INVENTION

1. Field of the Invention

The present invention relates generally to an additional service in a communication system. In particular, the present invention relates to a method for providing a Teletype/Telecommunications Device for the Deaf (TTY/TDD) service using a wireless terminal, and a wireless terminal implementing such a method.

2. Description of the Related Art

Communication technologies, particularly mobile communication technologies, have been developed to provide data service as well as voice service. Communication systems provide additional services to satisfy various user demands. One of the additional services is a TTY/TDD service. The TTY/TDD service is a service by which hearing-impaired people can make/receive a telephone call.

A TTY/TDD device is required for the TTY/TDD service. The TTY/TDD device comprises a keyboard, a modem, and a display unit connected to a wired/wireless phone via the modem. The TTY/TDD device converts voice received from another subscriber to text messages and displays the converted text messages on the display unit, and converts text messages input through the keyboard to voice and transmits the converted voice to the wired/wireless phone. By using this, hearing-impaired people also can make/receive a telephone call.

Recently, it has become fundamental in many countries to provide a phone call service to hearing-impaired people based on the TTY/TDD service, and a TTY/TDD function has become popular in mobile communication standards. Thus, the TTY/TDD service has been provided by wireless terminals.

As well known, 13K Qualcomm Code Excited Linear Prediction (QCELP) and Enhanced Variable Rate Code (EVRC) vocoders are representative voice compression techniques widely used in 2 G and 3 G mobile communication systems. In these vocoders, the TTY/TDD function is implemented as IS-733-3 and IS-127-4, respectively. That is, the TTY/TDD function of the EVRC vocoder is defined in IS-127-4 which is incorporated herein by reference, and the TTY/TDD function of the QCELP vocoder is defined in IS-733-3 which is also incorporated herein by reference.

The encoder of such a vocoder processes voice samples in 20-ms frame basis and transmits the processed voice information. The decoder of the vocoder receives voice information and reproduces voice samples in a reverse order to the encoder operation. The encoder in which the TTY/TDD function is implemented determines whether input Pulse Code Modulation (PCM) samples are voice or TTY/TDD text. In case of voice, the encoder transmits voice information, and in case of TTY/TDD text, the encoder transmits text information. The decoder also determines whether received information is voice information or text information by analyzing the received information and reproduces voice samples or TTY text tones according to the result of the determination. The TTY/TDD function supports voice carryover/hearing carryover (VCO/HCO). The VCO allows TTY/TDD text receiving and speaking to be switched, and the HCO allows TTY/TDD text transmitting and hearing to be switched. A communication system equipped with the encoder and decoder of the vocoder in which the TTY/TDD function is implemented enables communications between a hearing-impaired person and a person without any speech or hearing disabilities and a hearing-impaired person or between hearing-impaired persons.

However, since current wireless terminals provide none of a call connection request signal, a call ready signal, and an absence signal during a TTY/TDD service, hearing-impaired people cannot immediately recognize whether a call is in a connection state or in an absence state.

SUMMARY OF THE INVENTION

An object of the present invention is to address at least the above problems and/or disadvantages. Accordingly, an object of the present invention is to provide a method and a device for signaling whether a call in a connection state or in an absence state so that hearing-impaired people can recognize the states when a Teletype/Telecommunications Device for the Deaf (TTY/TDD) service is performed in a wireless terminal.

According to one aspect of the present invention, a method of performing a TTY/TDD service in a wireless terminal is provided. The method comprises the steps of changing the wireless terminal to a vibration mode when the TTY/TDD service is performed, if a called party number and a call key are input, transmitting a call connection request signal and generating a first vibration, and generating a second vibration if a call ready signal is received after the call connection request signal is transmitted and generating a third vibration if an absence signal is received.

According to another aspect of the present invention, a wireless terminal is provided where a vibration can be generated when TTY/TDD service is performed.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Exemplary embodiments of the present invention will be described herein below with reference to the accompanying drawings. In the following description, well-known functions or constructions are omitted for clarity and conciseness.

A Teletype/Telecommunications Device for the Deaf (TTY/TDD) service that enables hearing-impaired people to conduct a telephone call is called a TTY service.

Figure 1:
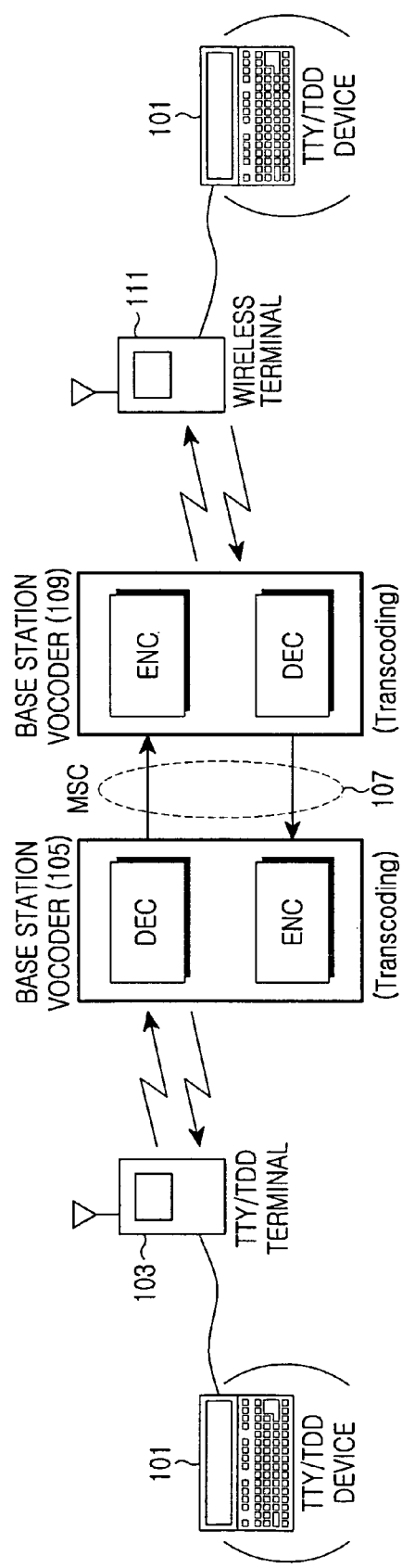
FIG. 1 is a schematic diagram illustrating a network configuration in which a communication system provides a Teletype/Telecommunications Device for the Deaf (TTY/TDD) service according to an exemplary embodiment of the present invention.

FIG. 1 is a schematic diagram illustrating a network configuration in which a communication system provides a TTY/TDD service according to an exemplary embodiment of the present invention. Referring to FIG. 1, the network in which a communication system provides the TTY service comprises a TTY/TDD terminal 103, external TTY/TDD devices 101, main station vocoders 105 and 109, a mobile switching center (MSC) 107, and a wireless terminal 111.

The TTY/TDD terminal 103 may provide the TTY/TDD service, and when the TTY/TDD service is executed, the TTY/TDD terminal 103 is changed to a vibration mode and a text input mode. Detailed description will be performed later with reference to FIG. 2. Herein, the TTY/TDD terminal 103 can be a wireless terminal or a personal digital assistant (PDA).

Each of the external TTY/TDD devices 101 can perform the TTY/TDD service by being connected to a typical wireless terminal, and it can be an external key input device connected to the TTY/TDD terminal 103.

Each of the main station vocoders 105 and 109 comprises an encoder and a decoder and supports voice carryover/hearing carryover (VCO/HCO). The encoder of the main station vocoder 105 processes voice samples in twenty (20) milliseconds frame basis and transmits the processed voice samples. The encoder also determines whether input Pulse Code Modulation (PCM) samples are voice or TTY/TDD text. In case of voice, the encoder transmits voice information, and in the case of TTY/TDD text, the encoder transmits text information. The decoder of the main station vocoder 105 receives voice information and reproduces voice samples in a reverse order to the encoder operation. The decoder also determines whether received information is voice information or text information by analyzing the received information and reproduces voice samples or TTY text tones according to the result of the determination.

The TTY/TDD function supports VCO/HCO. The VCO allows TTY/TDD text receiving and speaking to be switched, and the HCO allows TTY/TDD text transmitting and hearing to be switched.

The MSC 107 performs a central control function of processing signals transmitted/received from/to each mobile base station and controlling the mobile base station to efficiently operate. The MSC 107 using a standard telephone signal controls wireless link and wired link, and connects a wireless terminal to a public switched telephone network (PSTN) (a mobile base station) or another communication network. The MSC 107 comprises a controller, a channel module, and miscellaneous devices and has a control function required for mobility of wireless terminals and an efficient operation of frequency resources. The MSC 107 also has a system operation and maintenance function, a record storage function for billing, and a database for containing information on wireless terminals.

The wireless terminal 111 is a terminal with which a subscriber can communicate with another PSTN subscriber or wireless terminal subscriber through base stations while moving in a mobile communication service area. The wireless terminal 111 can be a PDA.

Since interoperations between components for achieving the TTY/TDD service based on the configuration of a mobile communication network will be understood by those skilled in the art, detailed description is omitted for clarity and conciseness.

Figure 2:
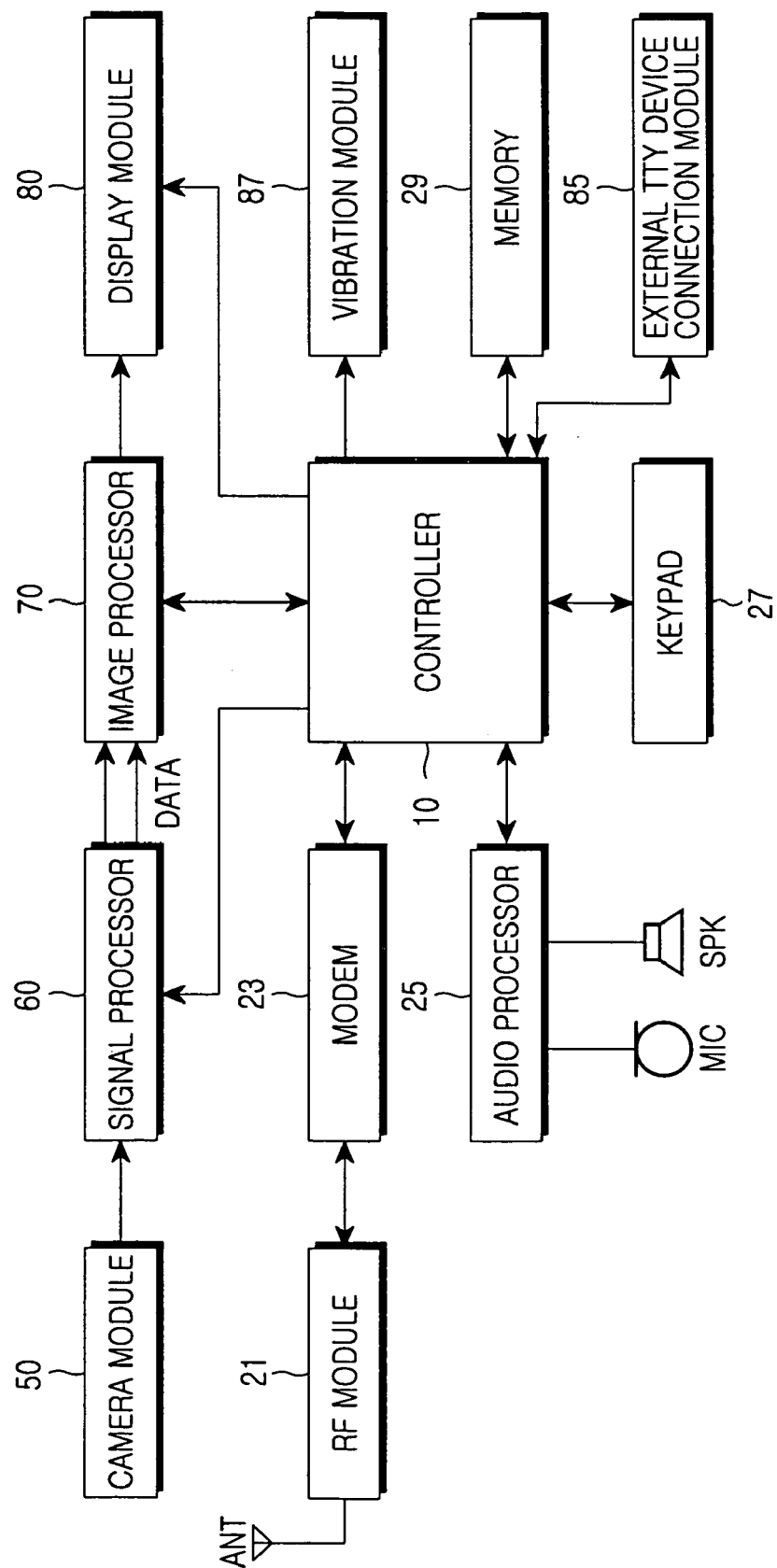
FIG. 2 is a block diagram illustrating a wireless terminal according to an exemplary embodiment of the present invention.

FIG. 2 is a block diagram illustrating a wireless terminal according to an exemplary embodiment of the present invention. Referring to FIG. 2, a radio frequency (RF) module 21 performs communication of the wireless terminal. The RF module 21 comprises a RF transmitter for upconverting a frequency of a transmission signal and amplifying the frequency-upconverted signal and a RF receiver for low noise amplifying a received signal and downconverting a frequency of the low-noise-amplified signal.

A modem 23 comprises a transmitter for encoding and modulating the transmission signal and a receiver for demodulating and decoding the received signal.

An audio processor 25 can comprise a codec including a data codec for processing packet data and an audio codec for processing an audio signal such as voice. The audio processor 25 converts a digital audio signal received from the modem 23 to an analog audio signal by using the audio codec and reproduces the analog audio signal. The audio processor 25 also converts an analog audio signal generated by a microphone to a digital audio signal by using the audio codec and transmits the digital audio signal to the modem 23. The codec can be separately included in the wireless terminal or included in a controller 10.

A keypad 27 comprises keys for inputting numeric and character information and function keys for establishing various functions. The keypad 27 also can comprise a TTY/TDD service execution key and a text input key according to an exemplary embodiment of the present invention.

A memory 29 can comprise a program memory and a data memory. A program for controlling a general operation of the wireless terminal is stored in the program memory. Data generated during execution of the program is temporary stored in the data memory. According to an exemplary embodiment of the present invention, a program for executing the TTY/TDD service and a program for generating a first, second, or third vibration rating in response to a detected call connection request, call ready, or absence signal are stored in the program memory. Herein, the third vibration is stronger than the second vibration, and the second vibration is stronger than the first vibration. The strength can be established by a user. A program for displaying an image or text data or generating a first, second, or third vibration pattern in response to a detected call connection request, call ready, or absence signal can be stored in the program memory. The controller 10 controls a general operation of the wireless terminal. The controller 10 can comprise the modem 23 and the codec. According to an exemplary embodiment of the present invention, the controller 10 displays a TTY/TDD mode selection window when a TTY/TDD service menu is selected, and if the TTY/TDD mode is selected, the controller 10 changes the wireless terminal to a vibration mode and displays a TTY/TDD mode window. After transmitting a detected called party number, the controller 10 generates the first vibration if the call connection request signal is detected, the second vibration if the call ready signal is detected, and the third vibration if the absence signal is detected. According to selection of the user, the controller 10 can output a first image or a first text message if the call connection request signal is detected, a second image or a second text message if the call ready signal is detected, and a third image or a third text message if the absence signal is detected. In addition, if an external TTY/TDD device is connected, the controller 10 can display the TTY/TDD mode selection window.

A TTY connected to the external TTY/TDD device connection module 85 comprises a keyboard, a liquid crystal display (LCD) screen, and a data connector. If information is entered via the keyboard, the TTY converts it to a specific sound, and the sound is transmitted to a called party telephone through a calling party telephone. The called party also has a TTY and can acknowledge the sound as text through a LCD screen. If an external TTY/TDD device is connected to the called party telephone, the TTY/TDD mode selection window is displayed. If a vibration module 87 is set to the vibration mode, the vibration module 87 informs the user that a communication signal is received by generating a vibration when the communication signal is received. According to an exemplary embodiment of the present invention, the vibration module 87 generates the first vibration rating or the first vibration pattern if a call connection request signal is detected by the controller 10, the second vibration rating or the second vibration pattern if a call ready signal is detected by the controller 10, and the third vibration rating or the third vibration pattern if an absence signal is detected by the controller 10.

A camera module 50 takes picture data and comprises a camera sensor for converting a photographed optical signal to an electrical signal. Herein, it is assumed that the camera sensor is a charge coupled device (CCD) sensor.

A signal processor 60 converts a picture signal output from the camera module 50 to an image signal. Herein, the signal processor 60 can be implemented by using a digital signal processor (DSP).

An image processor 70 generates image data to display the image signal output from the signal processor 60 on a display module 80. The controller controls the image processor 70 to fit the received image signal to the specification of the display module 80, and the image processor 70 compresses or expands the image data. In addition, the image processor 70 transmits a beginning address of the output image data to the display module 80, or the controller 10 controls the image processor 70 to modify and transmit the beginning address.

The display module 80 displays the image data output from the image processor 70. The display module 80 can use a LCD, and in this case, the display module 80 comprises a LCD controller, a memory for storing the image data, and a LCD display unit. Herein, if the LCD is implemented in a touch screen method, the keypad 27 and the LCD can be input modules. The display module 80 comprises an image data display unit for displaying the image data. According to an exemplary embodiment of the present invention, a TTY/TDD mode window 81 is divided into a display window 82 and an input window 84, wherein transmitted/received text data is displayed on the display window 82 and text data input by the user is displayed on the input window 84.

An operation of the wireless terminal will now be described with reference to FIG. 2. When placing a phone call, a user performs a dialing operation by using the keypad 27 and establishes a calling mode. Then the controller 10 detects the calling mode, processes the received dial information through the modem 23, converts the dial information to a RF signal through the RF module 21, and outputs the RF signal. If a called party generates a response signal, the controller 10 detects the response signal through the RF module 21 and the modem 23. Then, a voice communication path is formed through the audio processor 25, and the user can conduct the phone call. In a called mode, the controller 10 detects the called mode through the modem 23 and generates a ring signal through the audio processor 25. If the user answers the call, the controller 10 detects the response. Then, a voice communication path is established through the audio processor 25, and the user can conduct the phone call. In the calling and called modes, though the voice communication is illustrated, a data communication function in which packet data and image data are transmitted/received can be performed besides the voice communication. In an idle mode or in a case of text communication, the controller 10 displays text data processed through the modem 23 on the display module 80.

An operation of executing the TTY/TDD service in the wireless terminal will now be described. When a user selects the TTY/TDD service mode by using the keypad 27, the controller 10 controls the memory 29 and the display module 80 to display the TTY/TDD service selection window. When the user selects the TTY/TDD service using the keypad 27, the controller 10 enters into the TTY/TDD service mode and controls the memory 29 and the display module 80 to display the TTY/TDD service mode window 81. When the user inputs a called party telephone number and pushes a call button by using the keypad 27, the controller controls the memory 29 and the RF module 21 to operate a TTY/TDD service application, and if a call connection request signal, a call ready signal, or an absence signal is detected, the controller 10 controls the vibration module 87 to generate a vibration, an image, or a message corresponding to the detected signal.

Figure 3A:
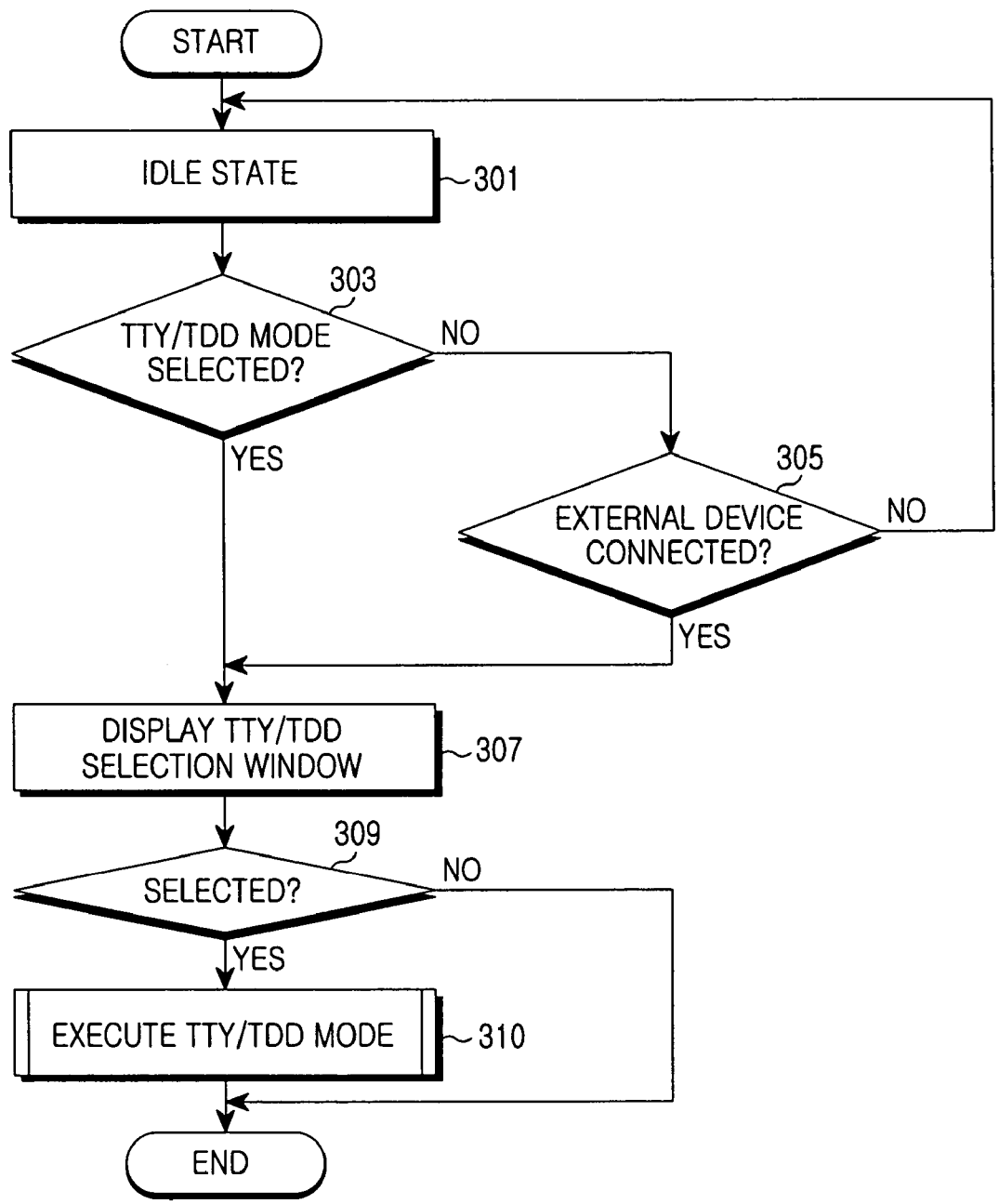
FIGS. 3A and 3B are flowcharts illustrating a process of performing a TTY/TDD service in a TTY/TDD wireless terminal according to an exemplary embodiment of the present invention.
Figure 3B:
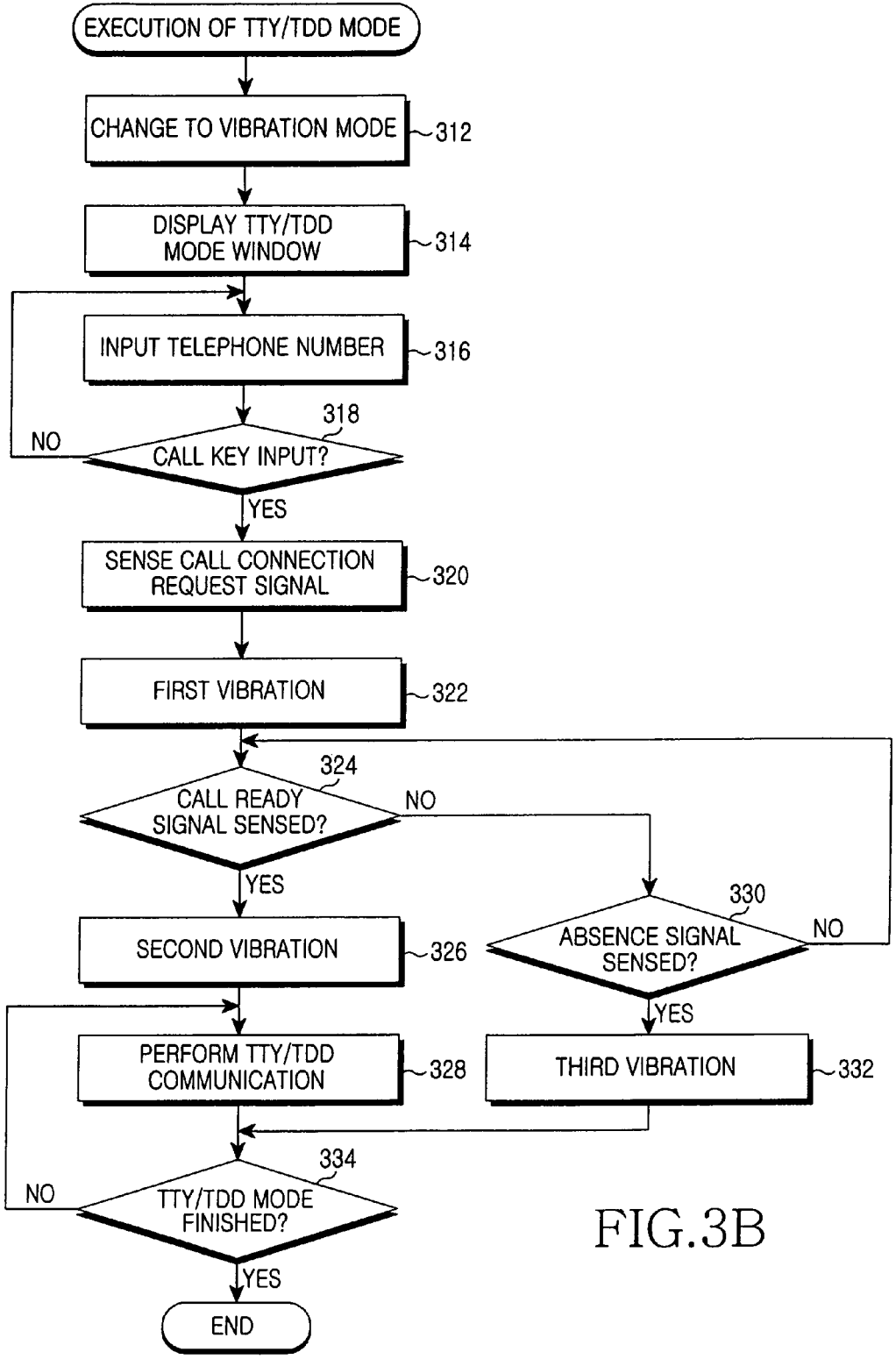
Figure 5A:
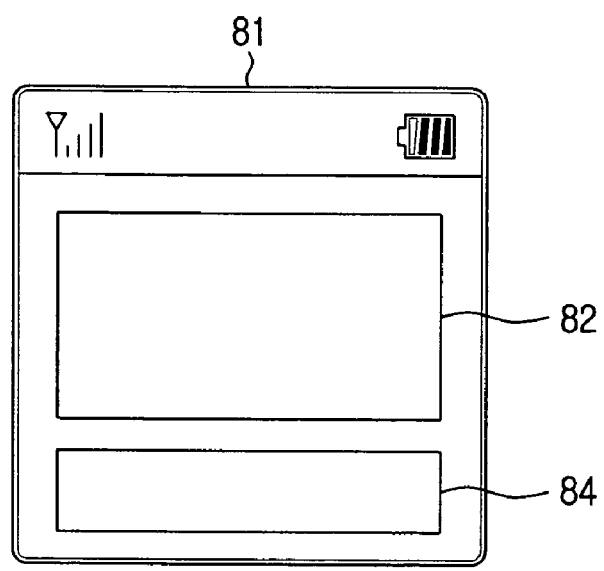
FIGS. 5A through 5C are illustrative diagrams illustrating TTY/TDD service mode windows according to an exemplary embodiment of the present invention.
Figure 5B:
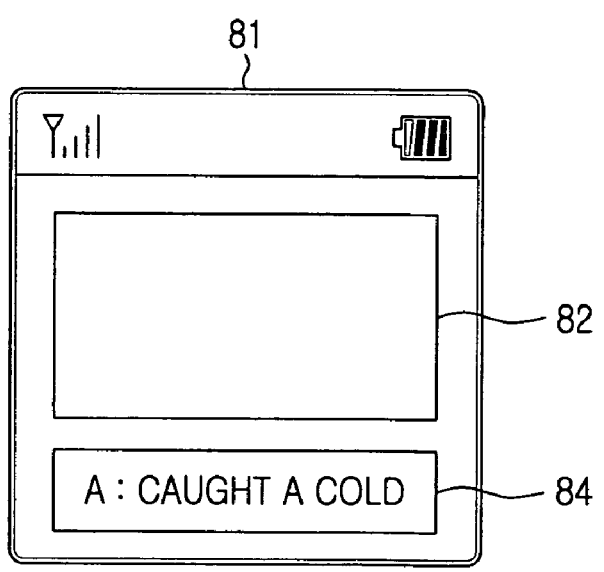
Figure 5C:
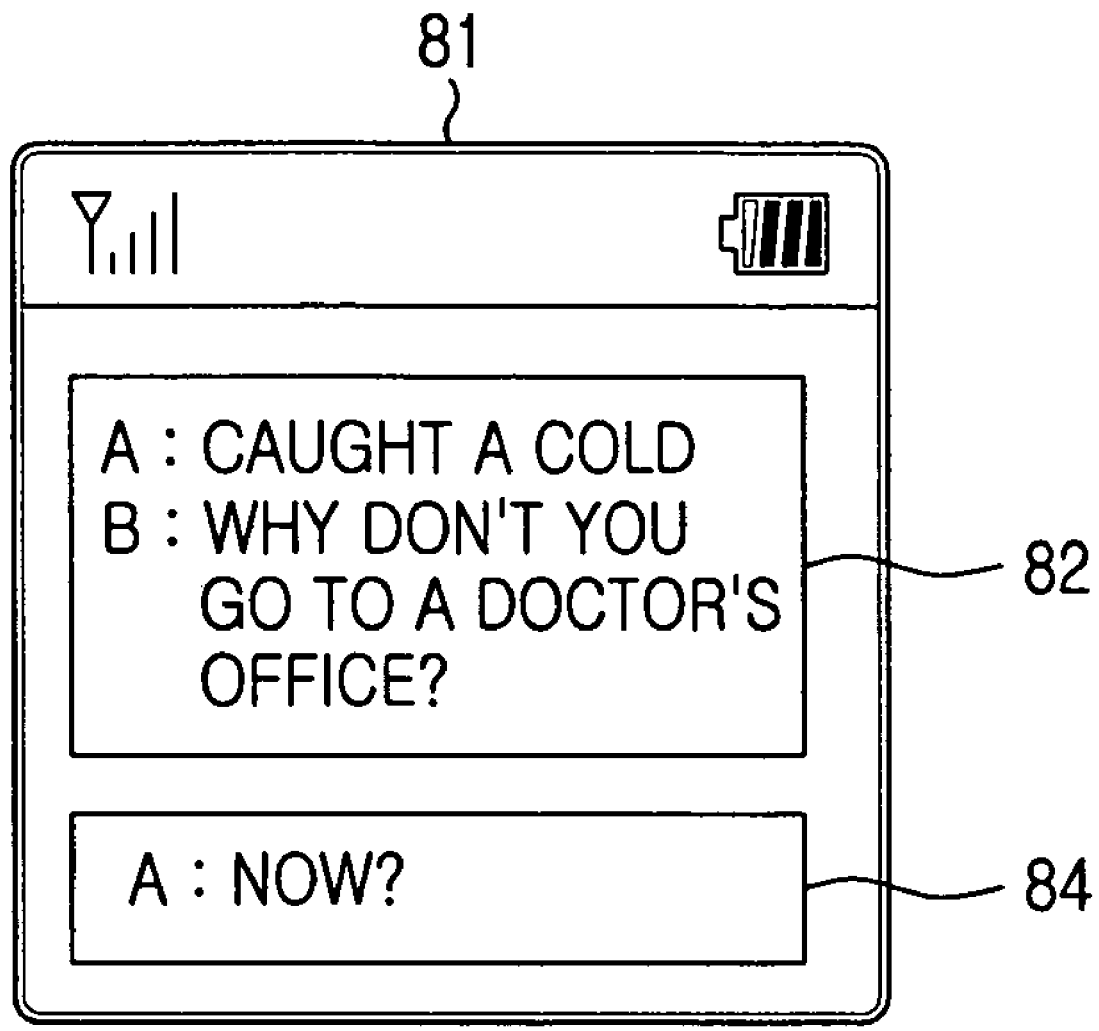

FIGS. 3A and 3B are flowcharts illustrating a process of performing a TTY/TDD service in a TTY/TDD wireless terminal according to an exemplary embodiment of the present invention. FIGS. 5A to 5C are illustrative diagrams of TTY/TDD service mode windows according to the exemplary embodiment of the present invention. Referring to FIGS. 3A, 3B, and 5A through 5C, the process of performing the TTY/TDD service in the TTY/TDD wireless terminal will now be described. In step 301 of an idle mode, if a user selects the TTY/TDD service mode by using the keypad 27, in step 303, the controller 10 detects the TTY/TDD service mode. In step 307, the controller 10 controls the memory 29 and the display module 80 to display the TTY/TDD service selection window to perform the TTY/TDD service.

In step 301 of the idle mode, if the external TTY/TDD device connection module 85 included in the wireless terminal is connected to the external TTY/TDD device 101 via data cable or wireless communication, in step 305, the controller 10 detects the connection of the external TTY/TDD device 101. In step 307, the controller 10 controls the memory 29 and the display module 80 to display the TTY/TDD service selection window to perform the TTY/TDD service. Herein, the external TTY/TDD device connection module 85 can be a communication port to be connected to an external device such as a hands-free device.

In step 309, if the user selects the TTY/TDD service in the TTY/TDD service selection window, the TTY/TDD service mode is executed in step 310. The execution of the TTY/TDD service mode will now be described in more detail. In step 312, the controller 10 changes the wireless terminal to the vibration mode by controlling the memory 29. That is, a notice mode in which sound such as a bell sound is output when a communication signal is detected is changed to the vibration mode in which a vibration is generated, and all notice sound is output by using the vibration. In step 314, the controller 10 controls the memory 29 and the display module 80 to display the TTY/TDD service mode window 81 shown in FIG. 5A. The TTY/TDD service mode window 81 shown in FIG. 5A is divided into the display window 82 and the input window 84, wherein transmitted/received text data is displayed on the display window 82 and text data input by the user is displayed on the input window 84.

If the user inputs a called party telephone number, in step 316, the controller 10 detects the input of the called party telephone number and controls the display module 80 to display the called party telephone number. If the user pushes the call button to execute the TTY/TDD service with the called party telephone number, in step 318, the input of the call button can be detected. In step 320, the controller 10 controls the RF module 21 to transmit a call connection request signal. In step 322, the controller 10 controls the memory 29 and the vibration module 87 to generate the first vibration. Herein, the first vibration is a weak vibration, and the user who is a hearing-impaired person can recognize that the TTY/TDD service call connection was requested by feeling the first vibration. In addition, a connection message can be displayed on the TTY/TDD service mode window 81 along with the first vibration, the first vibration can be generated differently from a general vibration by establishing a vibration pattern of the first vibration according to selection of the user, and an image can be displayed.

If a call connection is performed after the call connection request signal was transmitted, the RF module 21 receives a call ready signal. In step 324, the controller 10 detects the call ready signal. In step 326, the controller 10 controls the memory 29 and the vibration module 87 to generate the second vibration. Herein, the second vibration is an intermediate vibration, and the user who is the hearing-impaired person can recognize that the call is connected and in a call ready state by feeling the second vibration. In addition, a call connection message can be displayed on the TTY/TDD service mode window 81 along with the second vibration, the first vibration and the second vibration can be identified by establishing different vibration patterns, and an image informing of the call ready state can be displayed.

When the called party receives the telephone call, in step 328, the controller 10 operates the TTY/TDD service application and executes the TTY/TDD service. Herein, the execution of the TTY/TDD service is achieved by displaying input text messages on the input window 84 when the user inputs the text messages to be transmitted to the called party by using the keypad 27 as shown in FIG. 5B, displaying the input text messages on the display window 82 when the input text messages are transmitted, and displaying text messages transmitted from the called party on the display window 82 as shown in FIG. 5C. That is, as a chatting window, the text messages transmitted from the calling party and the called party is displayed on the display window 82, and the input text messages are displayed on the input window 84. When an end key is pushed to finish the TTY/TDD service, in step 334, the controller 10 detects the input of the end key and ends the operation of the TTY/TDD service application. However, unless the end key is input, the TTY/TDD service is continued.

Though the call connection request signal is transmitted, if the call connection is not performed since the called party conducts another telephone call, the RF module 21 receives the absence signal. Then, in step 330, the controller detects the absence signal. In step 332, the controller 10 controls the memory 29 and the vibration module 87 to generate the third vibration. Herein, the third vibration is a strong vibration, and the user who is the hearing-impaired person can recognize that the called party in an absence state by feeling the third vibration. In addition, an absence message can be displayed on the TTY/TDD service mode window 81 along with the third vibration, the first vibration, the second vibration, and the third vibration can be identified by establishing different vibration patterns, and an image informing of the absence state can be displayed.

As described above, the user who is the hearing-impaired person can immediately recognize a TTY/TDD service state by generating the first vibration if a call connection request signal is detected in the TTY/TDD service mode, the second vibration if a call ready signal is detected, and the third vibration if an absence signal is detected.

Figure 4A:
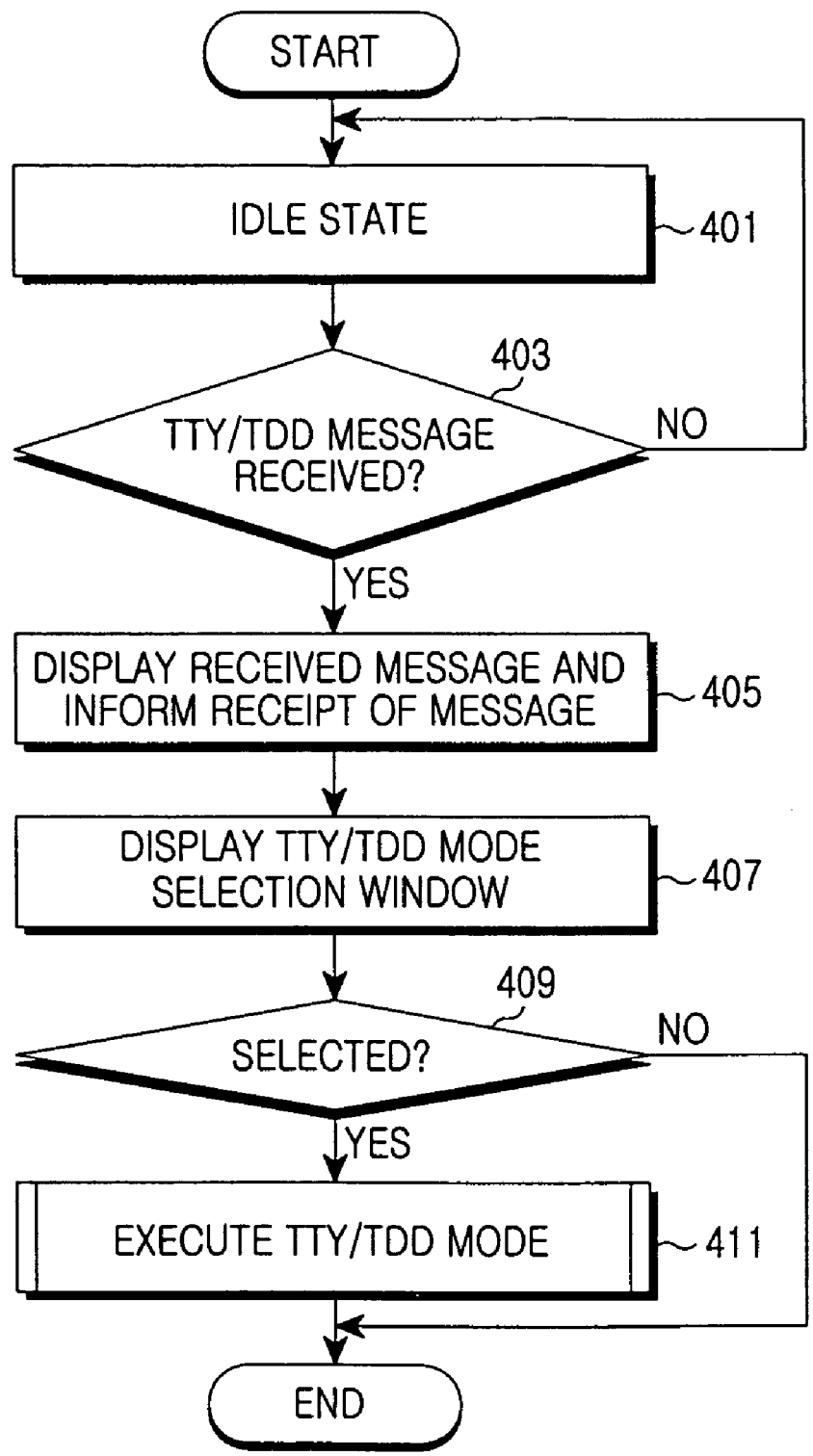
FIGS. 4A and 4B are flowcharts illustrating another process of performing the TTY/TDD service in the TTY/TDD wireless terminal according to the exemplary embodiment of the present invention.
Figure 4B:
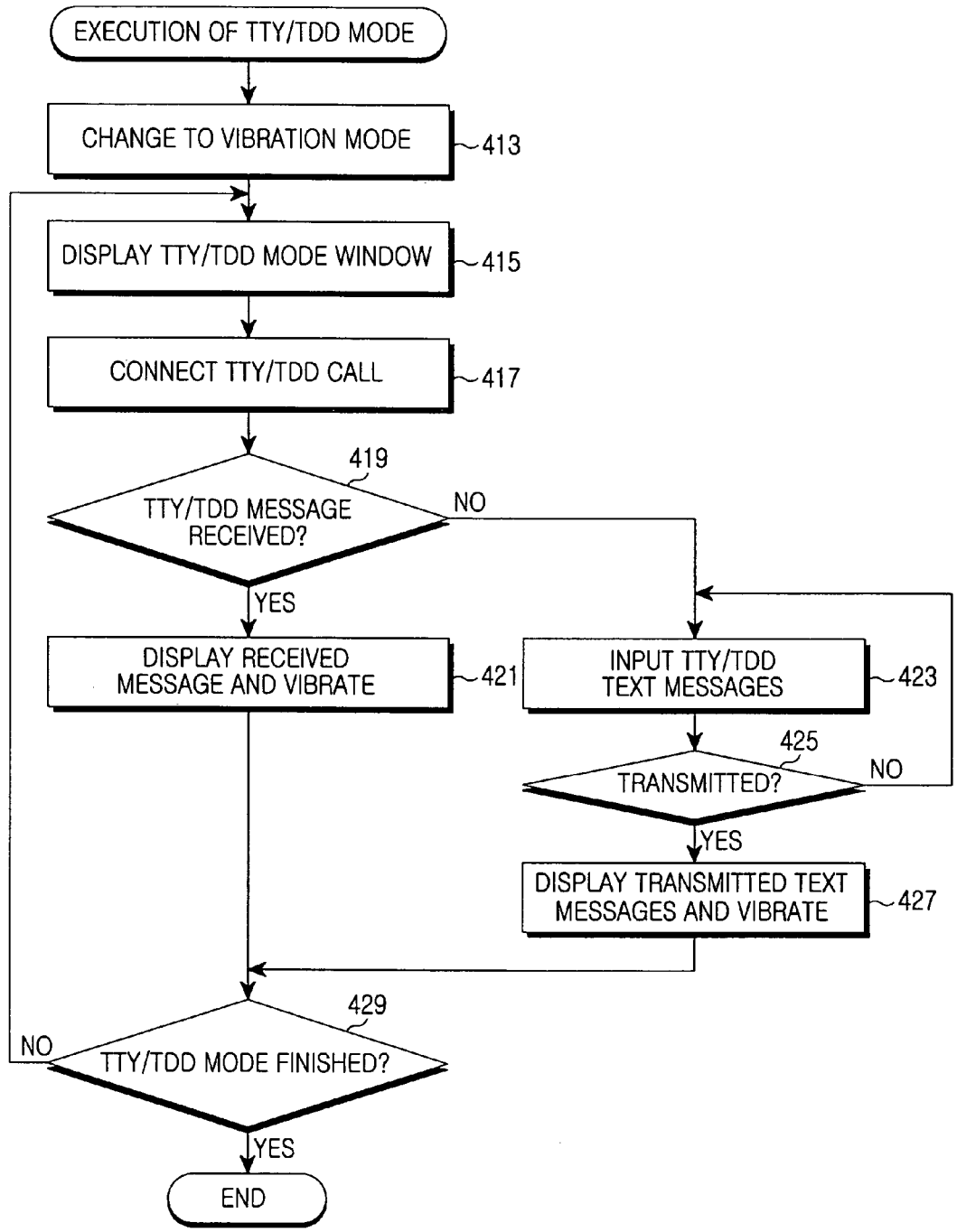

FIGS. 4A and 4B are flowcharts illustrating another process of performing the TTY/TDD service in the TTY/TDD wireless terminal according to an exemplary embodiment of the present invention. FIGS. 5A through 5C are illustrative diagrams of TTY/TDD service mode windows according to an exemplary embodiment of the present invention. Referring to FIGS. 4A, 4B, and 5A through 5C, the process of performing the TTY/TDD service in a called party TTY/TDD wireless terminal will now be described. In step 401 of an idle state, if a TTY/TDD message is received by the RF module 21, the controller 10 detects the TTY/TDD message in step 403. Herein, to differentiate a general text message from the TTY/TDD message, a CTM bit of a Bearer cap in a setup message specification is changed. A CTM value is changed by turning a bit 6 of the Bearer cap on/off. If a call setup is achieved after a CTM mode is turned on, the CTM bit is set to 1, and a network determines whether a wireless terminal operates as a CTM modem. In addition, a received call can be identified whether it is a TTY call or a general call by using the CTM bit.

In step 405, the controller 10 controls the display module 80 and the vibration module 87 to display the received TTY/TDD message and inform the called party that the TTY/TDD message was received by changing an incoming sound to a vibration mode. In step 407, the controller 10 controls the memory 29 and the display module 80 to display the TTY/TDD service selection window for performing the TTY/TDD service. Herein, the display of the TTY/TDD service selection window can be achieved after a predetermined time passes or when a specific key is pushed according to setting of the user.

If the user selects the TTY/TDD service in the TTY/TDD service selection window using the keypad 27, the controller 10 detects the selection of the TTY/TDD service in step 409. In step 411, the controller 10 executes the TTY/TDD service mode by operating a TTY/TDD service application. The execution of the TTY/TDD service mode will now be described in more detail. In step 413, the controller 10 changes the wireless terminal to the vibration mode by controlling the memory 29. That is, the notice mode in which sound such as a bell sound is output when a communication signal is detected is changed to the vibration mode in which a vibration is generated, and all notice sound is output by using the vibration. In step 415, the controller 10 controls the memory 29 and the display module 80 to display the TTY/TDD service mode window 81 shown in FIG. 5A. Herein, the initially received TTY/TDD message can be displayed on the display window 82 of the TTY/TDD service mode window 81. The TTY/TDD service mode window 81 shown in FIG. 5A is divided into the display window 82 and the input window 84, wherein transmitted/received text data is displayed on the display window 82 and text data input by the user is displayed on the input window 84. In step 417, the controller 10 operates the TTY/TDD service application and executes the TTY/TDD service. If TTY/TDD text messages are received by the RF module 21, the controller 10 detects the TTY/TDD text messages in step 419. In step 421, the controller 10 displays the received TTY/TDD text messages on the display window 82 as shown in FIG. 5C and controls the vibration module 87 to generate a vibration. The vibration can be the first, second, or third vibration, and a vibration rating and pattern can be controlled by setting of the user. Herein, it is preferable that the vibration be generated simultaneously when the received TTY/TDD text messages are displayed. In addition, an image can be displayed.

If the user inputs text messages to be transmitted to the calling party in the input window 84 by using the keypad 27, the controller 10 detects the input of the text messages in step 423 and controls the TTY/TDD service mode window 81 to display the text messages as shown in FIG. 5B. If the user pushes a transmission key using the keypad 27, the controller 10 controls the RF module 21 to transmit the text messages to the calling party in step 425. In step 427, the controller 10 controls the TTY/TDD service mode window 81 to display the transmitted TTY/TDD text messages on the display window 82 as shown in FIG. 5C and controls the vibration module 87 to generate a vibration. The vibration can be the first, second, or third vibration, and a vibration rating can be controlled by setting of the user. Herein, it is preferable that the vibration be generated simultaneously when the transmitted TTY/TDD text messages are displayed. In addition, a vibration rating and pattern of the vibration can be variously determined according to selection of the user.

As described above, according to the exemplary embodiments of the present invention, a TTY/TDD service can be supported in a wireless terminal without any help of other external devices, and a user who is a hearing-impaired person can immediately recognize a TTY/TDD text reception or transmission state by generating a different vibration when a call connection request signal, a call ready signal, or an absence signal is detected and generating a vibration, text messages, and/or an image when TTY/TDD text messages are received or transmitted during the TTY/TDD service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of performing a Teletype/Telecommunications Device for the Deaf (TTY/TDD) service in a wireless terminal, the method comprising the step of:
    changing all notice modes of the wireless terminal to a vibration mode when a user selects a TTY/TDD service mode by using a keypad;
    transmitting a call connection request signal if the user inputs a called party number and call key, and outputting a call connection request message together with an established first vibration to a TTY/TDD service window according to the call connection request;
    outputting a call ready message together with a second vibration different from the first vibration to the TTY/TDD service window if a call connection is performed after transmitting the call connection request message; and
    outputting an absence message together with a third vibration different from the first and second vibration to the TTY/TDD service window if a call connection is not performed after transmitting the call connection request message.

2. A method of performing a Teletype/Telecommunications Device for the Deaf (TTY/TDD) service in a wireless terminal, the method comprising the steps of:
    changing all the notice modes of the wireless terminal to a vibration mode and displaying a TTY/TDD service window when a user selects a TTY/TDD service mode by using a keypad;
    if TTY/TDD text messages are input in the displayed TTY/TDD service window and transmitted, outputting a vibration; and
    outputting the vibration and displaying the TTY/TDD text messages on the TTY/TDD service window if the TTY/TDD text message is received.

3. The method of claim 2, wherein the TTY/TDD service window comprises an input window and a display window.

4. A terminal for performing a Teletype/Telecommunications Device for the Deaf (TTY/TDD) service, the terminal comprising:
    a controller which is adapted to change all notice mode to a vibration mode when a user selects a TTY/TDD service mode in an operation mode of the terminal; and
    a vibration module which is adapted to output a first vibration, a second vibration and third vibration;
    wherein, the first vibration is established according to a call connection request when transmitting the call connection request if the user inputs a called party number and a call key, the second vibration is to be different from the first vibration if a call connection is performed after transmitting the call connection request message, and the third vibration is to be different from the first and second vibrations if a call connection is not performed after transmitting the call connection request.

5. The terminal of claim 4, wherein the vibration module generates at least one of:
    a first vibration, if a call connection request is transmitted from the terminal;
    a second vibration, if a call ready signal is transmitted from the terminal; and
    a third vibration, if a call missed signal is transmitted from the terminal.

* * * * *

UNITED STATES PATENT AND TRADEMARK OFFICE
CERTIFICATE OF CORRECTION

PATENT NO.      : 7,643,619 B2  Page 1 of 1
APPLICATION NO. : 11/222843
DATED           : January 5, 2010
INVENTOR(S)     : In-Hyung Jung It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Sixteenth Day of November, 2010

David J. Kappos
*Director of the United States Patent and Trademark Office*